(12) United States Patent
Westlake et al.

(10) Patent No.: US 7,028,326 B1
(45) Date of Patent: Apr. 11, 2006

(54) METHOD AND INTERFACE FOR LINKING TERMS IN AN ELECTRONIC MESSAGE TO PROGRAM INFORMATION

(75) Inventors: Mark Sheridan Westlake, Indianapolis, IN (US); Robert Joseph Logan, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/582,371

(22) PCT Filed: Jan. 8, 1999

(86) PCT No.: PCT/US99/00408

§ 371 (c)(1),
(2), (4) Date: Nov. 9, 2000

(87) PCT Pub. No.: WO99/35847

PCT Pub. Date: Jul. 15, 1999

Related U.S. Application Data

(60) Provisional application No. 60/070,745, filed on Jan. 8, 1998.

(51) Int. Cl.
*G06F 3/00* (2006.01)

(52) U.S. Cl. ............................. 725/39; 725/44; 725/47; 725/58; 709/206; 709/207; 709/246

(58) Field of Classification Search ................ 709/246, 709/206, 207; 348/461, 468, 563; 725/39–40, 725/51–53, 58, 61, 136–137, 44, 47; 707/6
See application file for complete search history.

(56) References Cited

U.S. PATENT DOCUMENTS

| 5,353,121 | A | 10/1994 | Young et al. |
| 5,479,266 | A | 12/1995 | Young et al. |
| 5,515,106 | A | 5/1996 | Chaney et al. |
| 5,765,033 | A | 6/1998 | Miloslavsky |
| 5,765,178 | A | 6/1998 | Tananka |
| 6,374,406 | B1 * | 4/2002 | Hirata .......................... 725/132 |
| 2002/0026496 | A1 * | 2/2002 | Boyer et al. ................. 709/218 |

FOREIGN PATENT DOCUMENTS

| WO | 98/26584 | 6/1998 |

* cited by examiner

*Primary Examiner*—Ngoc Vu
(74) *Attorney, Agent, or Firm*—Joseph J. Laks; Robert D. Shedd; Reitseng Lin

(57) ABSTRACT

The method of linking terms in an electronic message to program information in an electronic program guide (EPG) comprises the steps of receiving an electronic message, comparing terms in the electronic message to terms in the program information of the EPG, and displaying the electronic message so that any terms in the electronic message which have a match in the program information based on the step of comparing terms, are distinguishable from terms which have no such match. The electronic message interface is adapted to link terms in an electronic message to program information in an electronic program guide (EPG).

6 Claims, 5 Drawing Sheets

METHOD AND INTERFACE FOR LINKING TERMS IN AN ELECTRONIC MESSAGE TO PROGRAM INFORMATION

This application claims the benefit of 60/070,745, filed Jan. 8, 1998.

FIELD OF INVENTION

This invention generally relates to a method and interface for linking terms in an electronic message to program information.

BACKGROUND OF INVENTION

Electronic devices such as televisions and personal computers (PC) require a control system that includes a user interface system. Typically, a user interface provides information to a user and simplifies use of the device. One example of a user interface is an Electronic Program Guide (EPG) in a television system.

An EPG is an interactive, on-screen display feature that displays information analogous to TV listings found in local newspapers or other print media. In addition, an EPG also includes information necessary for collating and decoding programs. An EPG provides information about each program within the time frames covered by the EPG, which typically ranges from the next hour up to seven days. The information contained in an EPG includes programming characteristics such as channel number, program title, start time, end time, elapsed time, time remaining, rating (if available), topic, theme, and a brief description of the program's content. EPGs are usually arranged in a two-dimensional table or grid format with time information on one axis and channel information on the other axis.

Unlike non-interactive guides that reside on a dedicated channel and merely scroll through the current programming on the other channels, usually showing only the programs which begin within the next 2 to 3 hours, EPGs allow viewers to select any channel at any time during some period into the future, e.g., up to seven days forward. Further EPG features include the ability to highlight individual cells of the grid containing program information. Once highlighted, the viewer can perform functions pertaining to that selected program. For instance, the viewer could instantly switch to that program if it is currently being aired. Viewers could also program one touch video cassette recording (VCR) or the like if the television is properly configured and connected to a recording device. Such EPGs are known in the art and described, for instance, in U.S. Pat. Nos. 5,353,121; 5,479,268; and 5,479,266 issued to Young et al. and assigned to StarSight Telecast, Inc.

In addition, U.S. Pat. No. 5,515,106, issued to Chaney etc., and assigned to the same assignee of the present invention, describes in detail an exemplary embodiment including data packet structure necessary to implement an exemplary program guide system. The exemplary data packet structure is designed so that both the channel information (e.g., channel name, call letters, channel number, type, etc.) and the program description information (e.g., title, rating, star, etc.) relating to a program may be transmitted from a program guide database distributor to a subscriber's receiving apparatus in an efficient manner.

User interfaces such as EPGs are applicable to analog and digital television systems and to other electronic devices such as personal computers. As electronic devices become increasingly complex with a multitude of features, the need for a robust and easy-to-use user interface becomes ever more important. For example, separate electronic systems having respective interfaces for controlling features of each system are now being combined into a single system requiring a single user interface. One specific example is the so-called PCTV which includes features of both a personal computer and a television. The user interface system for such a device must provide both clear communication of computer and television related information and provide for simple control of both computer and television related features.

Typically, however, the computer-related programs and operations are implemented independently of the television programs and operations. For example, when the user elects to compose, read and/or send an electronic message such as electronic message or electronic file, this is performed independently of any tuning, recording, and/or replaying of audio, video, or television programs. Likewise, the audio, video, or television programming, tuning, recording and/or replaying is performed independently of any information contained in electronic messages. While television programming information can be manually typed into an electronic message, this requires the sender to manually insert into the electronic message enough tuning information to enable the recipient to receive the subject program. The recipient then must actually read such program information and tune his television, audiovisual recording device, audio receiver and/or recorder, or the like to the relevant program for implementation of the program. The term "implementation" includes, for example, displaying, audibly broadcasting, replaying, recording, and the like.

If the recipient mistakenly transcribes or forgets the information from the electronic message, the wrong program may be implemented. Likewise, if the sender of the electronic message mistakenly reads a part of the programming information when typing this information into the electronic message (e.g., wrong time, wrong channel number, etc.) or if the sender makes a typographical error, then the recipient may implement the wrong program or may attempt to implement the program at the wrong time. This can be especially problematic if the recipient attempts to implement the program after it has aired. The sender also might inadvertently leave out an important part of the programming information, such as the time of broadcast, the channel, etc.

The potential for mistakes and miscommunication in sending and receiving programming information, however, is not the only problem associated with such conventional techniques. Another problem lies in the lack of convenience. It is inconvenient for the sender to manually type the programming information into the electronic message. It also is inconvenient for the recipient to read the entire compilation of program information and then manually implement the subject program. Notably, reading of such information may break the recipient's concentration on the subject matter of the writing. In this regard, when the programming information is not concise, it tends to distract the reader.

There is consequently a need for a quick and convenient way of implementing a program which is referenced in an electronic messaging service such as e-mail without having to read, memorize, or manually transcribe all of the program information needed to implement the program.

SUMMARY OF THE INVENTION

The present invention overcomes at least one of the aforementioned problems and/or the aforementioned needs by providing a convenient way of electronically linking program information from an interactive interface of an audio, video or audiovisual device with the contents of an electronic message such as e-mail message.

The present invention provides a convenient way of implementing a program identified in an electronic message without having to memorize, manually transcribe, or otherwise review all of the requisite programming information.

The present invention also provides a convenient way of electronically linking program information with the contents of an electronic message.

Therefore, a method of linking terms in an electronic message to program information in an electronic program guide (EPG) comprises the steps of receiving an electronic message, comparing terms in the electronic message to terms in the program information of the EPG, and displaying the electronic message so that any terms in the electronic message which have a match in the program information based on the step of comparing terms, are distinguishable from terms which have no such match.

Also, an electronic message interface adapted to link terms in an electronic message to program information in an electronic program guide (EPG) comprises a receiver, a comparison unit, and a display device. The receiver is adapted to receive an electronic message. The comparison unit is associated with the receiver and is adapted to compare terms in the electronic message to terms in the program information of the EPG. The display device is connected at least indirectly to the comparison unit and is adapted to display the electronic message so that any terms in the electronic message which have a match in the program information based on the comparing of terms, are distinguishable from terms which have no such match.

DETAILED DESCRIPTION

Figure 1:
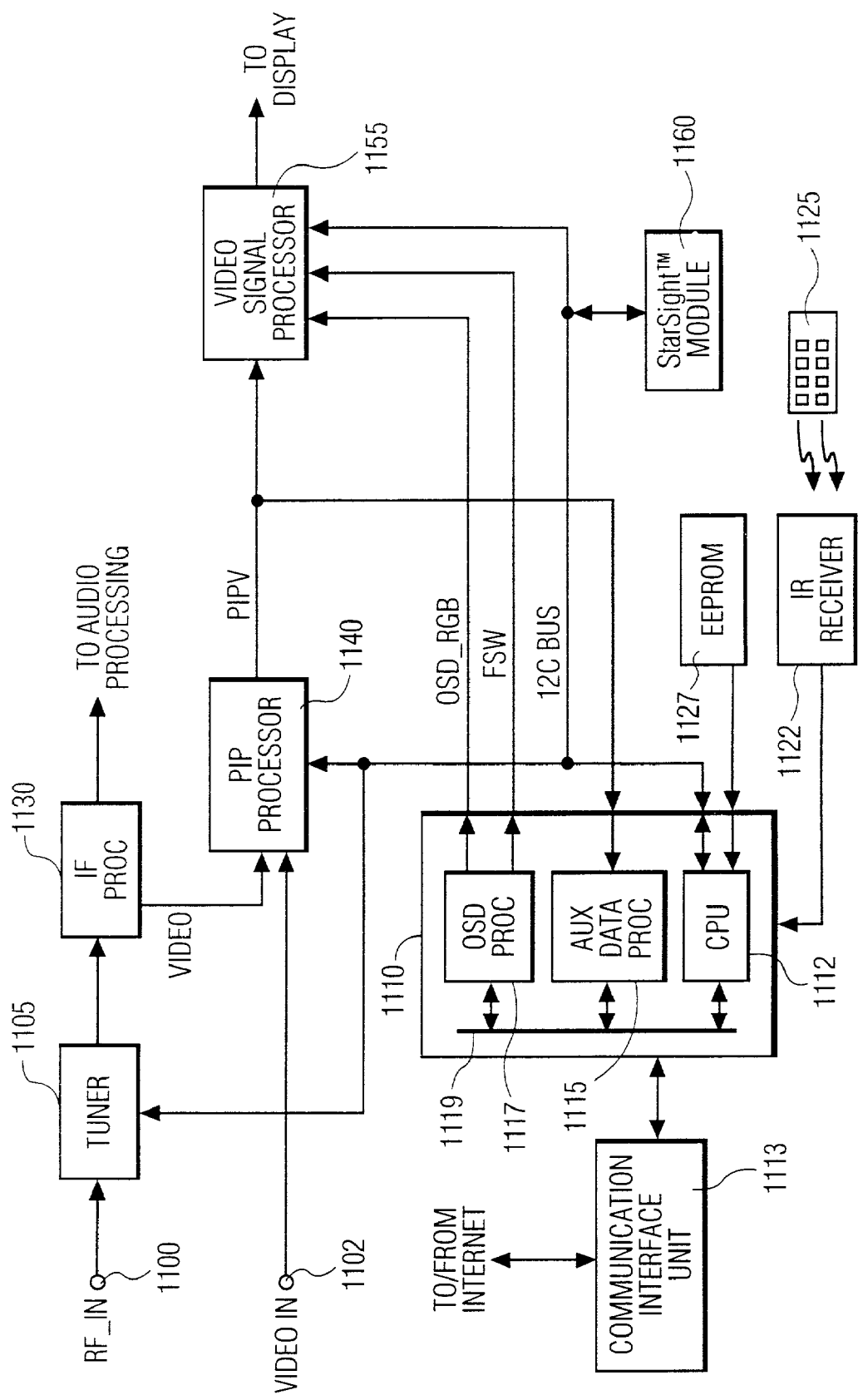
FIG. 1 shows an example of a television system suitable for processing electronic messages, generating an electronic program guide, and electronically linking program information with the contents of an electronic message, in accordance with the present invention.

FIG. 1 shows an example of a television system suitable for processing program guide information and electronic messages, as well as for electronically linking electronic messages to programming information and programming information to electronic messages, in accordance with the present invention. The television receiver shown in FIG. 1 is capable of processing both analog NTSC television signals and Internet information. The system shown in FIG. 1 has a first input 1100 for receiving television signal RF_IN at RF frequencies and a second input 1102 for receiving baseband television signal VIDEO IN. Signal RF_IN may be supplied from a source such as an antenna or cable system while signal VIDEO IN may be supplied, for example, by a video cassette recorder (VCR). Tuner 1105 and IF processor 1130 operate in a conventional manner for tuning and demodulating a particular television signal that is included in signal RF_IN. IF processor 1130 produces baseband video signal VIDEO representing the video program portion of the tuned television signal. IF processor 1130 also produces a baseband audio signal that is coupled to an audio processing section (not shown in FIG. 1) for further audio processing. Although FIG. 1 shows input 1102 as a baseband signal, the television receiver could include a second tuner and IF processor similar to units 1105 and 1130 for producing a second baseband video signal from either signal RF_IN or from a second RF signal source.

The system shown in FIG. 1 also includes a main microprocessor (mP) 1110 for controlling components of the television receiver such as tuner 1105, picture-in-picture processing unit 1140, video signal processor 1155, and StarSight® data processing module 1160. As used herein, the term "microprocessor" represents various devices including, but not limited to, microprocessors, microcomputers, microcontrollers and controllers. Microprocessor 1110 controls the system by sending and receiving both commands and data via serial data bus $I^2C$ BUS which utilizes the well-known $I^2C$ serial data bus protocol. More specifically, central processing unit (CPU) 1112 within mP 1110 executes control programs contained within memory, such as EEPROM 1127 shown in FIG. 1. in response to commands provided by a user, e.g., via IR 110 remote control 1125 and IR receiver 1122. For example, activation of a "CHANNEL UP" feature on remote control 1125 causes CPU 1112 to send a "change channel" command along with channel data to tuner 1105 via $I^2C$ BUS. As a result, tuner 1105 tunes the next channel in the channel scan list. Other examples of control programs stored in EEPROM 1127 are software for implementing the operations shown in FIG. 3 in accordance with the present invention as to be described below.

Main microprocessor 1110 also controls the operation of a communications interface unit 1113 for providing the capability to upload and download information to and from the Internet.

Communication interface unit 1113 includes, for example, a modem for connecting to an Internet service provider, e.g., via a telephone line or via a cable television line. The communication capability allows the system shown in FIG. 1 to provide electronic message capability and Internet related features such as web browsing in addition to receiving television programming.

CPU 1112 controls functions included within mP 1110 via bus 1119 within mP 1110. In particular. CPU 1112 controls auxiliary data processor 1115 and on-screen display (OSD) processor 1117. Auxiliary data processor 1115 extracts auxiliary data such as StarSight® data from video signal PIPV.

StarSight® data which provides program guide data information in a known format is typically received only on a particular television channel and the television receiver must tune that channel to extract StarSight® data. To prevent StarSight® data extraction from interfering with normal use of the television receiver, CPU 1112 initiates StarSight® data extraction by tuning the particular channel only during a time period when the television receiver is usually not in use (e.g., 2:00 AM). At that time, CPU 1112 configures decoder 1115 such that auxiliary data is extracted from horizontal line intervals such as line 16 that are used for StarSight® data. CPU 1112 controls the transfer of extracted StarSight® data from decoder 1115 via I²C BUS to StarSight® module 1160. A processor internal to the module formats and stores the data in memory within the module. In response to the StarSight® EPG display being activated (e.g., a user activating a particular key on remote control 1125), CPU 1112 transfers formatted StarSight® EPG display data from StarSight® module 1160 via I²C BUS to OSD processor 1117.

OSD processor 1117 operates in a conventional manner to produce R, G, and B video signals OSD_RGB that, when coupled to a display device, will produce a displayed image representing on-screen display information such as graphics and/or text comprising an EPG. OSD processor 1117 also produces control signal FSW which is intended to control a fast switch for inserting signals OSD_RGB into the system's video output signal at times when an on-screen display is to be displayed. For example, when a user enables an EPG, e.g., by activating a particular switch on remote control 1125. CPU 1112 enables processor 1117. In response, processor 1117 produces signals OSD_RGB representing the program guide data information previously extracted and already stored in memory, as discussed above. Processor 1117 also produces signal FSW indicating when the EPG is to be displayed.

Video signal processor (VSP) 1155 performs conventional video signal processing functions, such as luma and chroma processing. Output signals produced by VSP 1155 are suitable for coupling to a display device, e.g., a kinescope or LCD device (not shown in FIG. 1), for producing a displayed image. VSP 1155 also includes a fast switch for coupling signals produced by OSD processor 1117 to the output video signal path at times when graphics and/or text is to be included in the displayed image. The fast switch is controlled by control signal FSW which is generated by OSD processor 1117 in main microprocessor 1110 at times when text and/or graphics are to be displayed.

The input signal for VSP 1155 is signal PIPV that is output by picture-in-picture (PIP) processor 1140. When a user activates PIP mode, signal PIPV represents a large picture (large pix) into which a small picture (small pix) is inset. When PIP mode is inactive, signal PIPV represents just the large pix, i.e., no small pix signal is included in signal PIPV. PIP processor 1140 provides the described functionality in a conventional manner using features included in unit 1140 such as a video switch, analog-to-digital converter (ADC), RAM, and digital to analog converter (DAC).

For an EPG display, the display data included in the EPG display is produced by OSD processor 1117 and included in the output signal by VSP 1155 in response to fast switch signal FSW. When controller 1110 detects activation of the EPG display, e.g. when a user presses an appropriate key on remote control 1125, controller 1110 causes OSD processor 1117 to produce the EPG display using information such as program guide data from StarSight® module 1160. Controller 1110 causes VSP 1155 to combine the EPG display data from OSD processor 1117 and the video image signal in response to signal FSW to produce a display including EPG. The EPG can occupy all or only a portion of the display area.

When the EPG display is active, controller 1110 executes a control program stored in EEPROM 1127. The control program monitors the location of a position indicator, such as a cursor and/or highlighting, in the EPG display. A user controls the location of the position indicator using direction and selection keys of remote control 1125. Alternatively, the system could include a mouse device. Controller 1110 detects activation of a selection device, such as clicking a mouse button, and evaluates current cursor location information in conjunction with EPG data being displayed to determine the function desired, e.g., tuning a particular program. Controller 1110 subsequently activates the control action associated with the selected feature.

The processing and displaying of a program guide in accordance with the present invention may be implemented using a combination of software and hardware. For example, referring to FIG. 1, display of an EPG may be implemented by software in memory such as EEPROM 1127. Activation of an EPG. e.g., by a user pressing an EPG related button on remote control 1125, causes CPU 1112 to execute the EPG software routine. As part of generating an EPG display, CPU 1112 also accesses EPG data and graphics that may be stored in StarSight module 1160 via the I2C bus. Under control of the EPG software routine stored in EEPROM 1127, CPU 1112 enables OSD processor 1117 which formats the EPG data into a form suitable for producing an OSD representing the EPG data and graphics. The OSD data produced by OSD processor 1117 is coupled to video signal processor (VSP) 1155 via signal lines OSD_RGB. A fast switch in VSP 1155 couples the EPG OSD data to the output of VSP 1155 under control of signal FSW. That is, the software routine being executed by CPU 1112 determines when the EPG data is to be displayed (e.g., what portion of the display) and sets signal FSW to the appropriate state for causing the fast switch to couple the EPG data to the output.

An exemplary embodiment of the features of the system shown in FIG. 1 that have been described thus far comprises an ST9296 microprocessor produced by SGS-Thomson Microelectronics for providing the features associated with mP 1110; an M65616 picture-in-picture processor produced by Mitsubishi for providing the described basic PIP functionality associated with PIP processor 1140; and an LA7612 video signal processor produced by Sanyo for providing the functions of VSP 1155.

Figure 2:
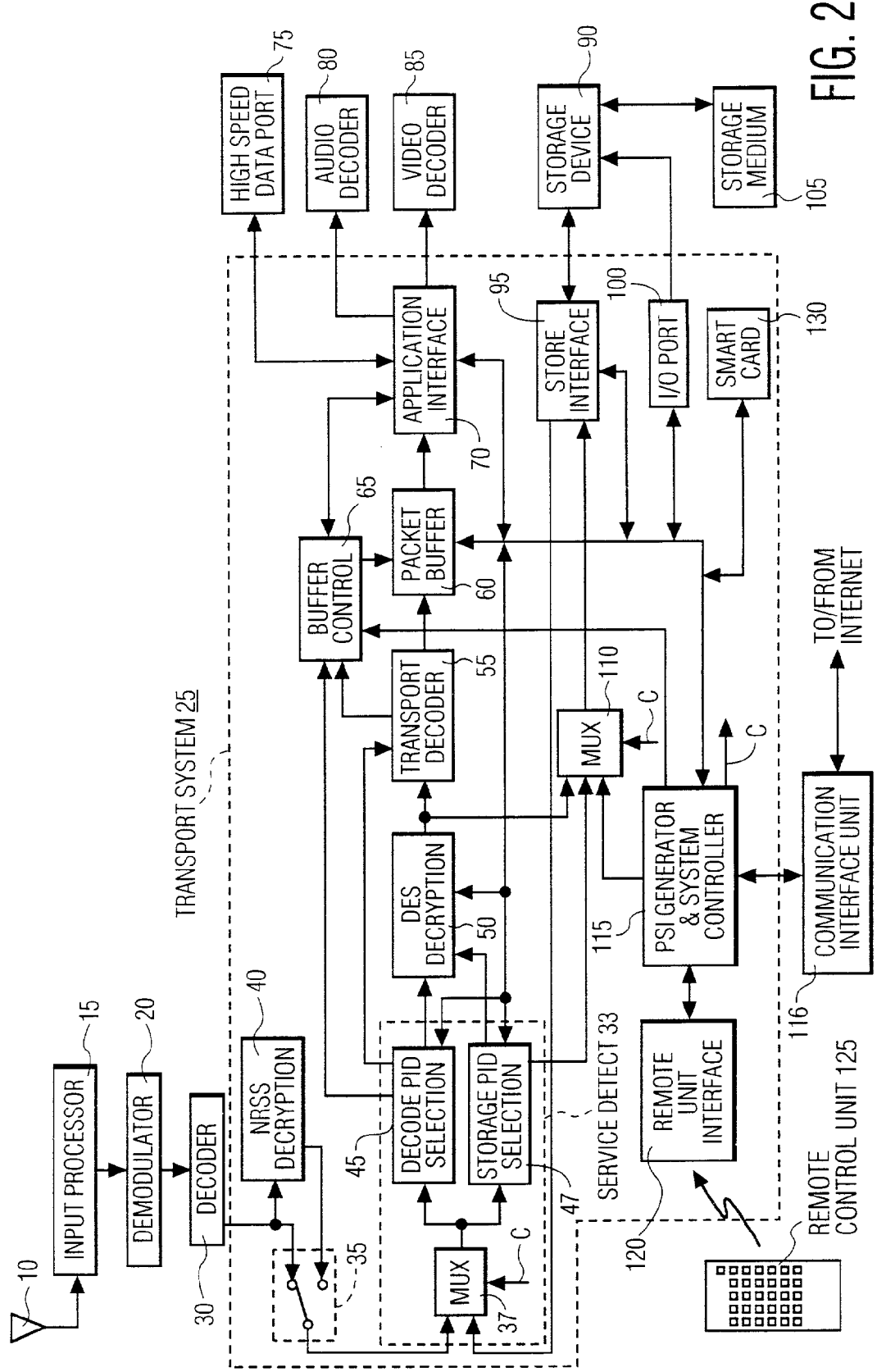
FIG. 2. shows an example of a digital video processing apparatus suitable for processing electronic messages, generating an electronic program guide, and electronically linking program information with the contents of an electronic message, in accordance with the present invention.

FIG. 2 shows another example of an electronic system suitable for processing program guide information and electronic messages, as well as for electronically linking contents of an electronic message to program information. As described below, the system shown in FIG. 2 is an MPEG compatible system for receiving MPEG encoded transport streams representing broadcast programs and is also capable of processing Internet information, including electronic messaging such as e-mail. The system shown in FIG. 2 is exemplary only. User interface systems are also applicable to other types of digital signal processing devices including non-MPEG compatible systems, involving other types of encoded datastreams. For example, other devices include digital video disc (DVD) systems and MPEG program streams, and systems combining computer and television functions such as the so-called "PCTV". Further, although the system described below is described as processing broadcast programs, this is exemplary only. The term 'program' is used to represent any form of packetized data such as telephone messages, computer programs, Internet data, audio presentations (e.g., from a remote source or from a local source), visual presentations, audiovisual presentations (e.g., from a remote source or a local source), or other communications, for example.

In overview, in the video receiver system of FIG. 2, a carrier modulated with video data is received by antenna 10 and processed by input processor unit 15. The resultant digital output signal is demodulated by demodulator 20 and decoded by decoder 30. The output from decoder 30 is processed by transport system 25 which is responsive to commands from remote control unit 125. System 25 provides compressed data outputs for storage, further decoding, or communication to other devices.

Video and audio decoders 85 and 80 respectively, decode the compressed data from system 25 to provide outputs for display. Data port 75 provides an interface for communication of the compressed data from system 25 to other devices such as a computer or High Definition Television (HDTV) receiver, for example. Storage device 90 stores the compressed data from system 25 on storage medium 105. Device 90, in a playback mode also supports retrieval of the compressed data from storage medium 105 for processing by system 25 for decoding, communication to other devices or storage on a different storage medium (not shown to simplify drawing).

Considering FIG. 2 in detail, a carrier modulated with video data received by antenna 10, is converted to digital form and processed by input processor 15. Processor 15 includes radio frequency (RF) tuner and intermediate frequency (IF) mixer and amplification stages for down-converting the input video signal to a lower frequency band suitable for further processing. The resultant digital output signal is demodulated by demodulator 20 and decoded by decoder 30. The output from decoder 30 is further processed by transport system 25.

Multiplexer (mux) 37 of service detector 33 is provided, via selector 35, with either the output from decoder 30, or the decoder 30 output further processed by a descrambling unit 40. Descrambling unit 40 may be, for example, a removable unit such as a smart card in accordance with ISO 7816 and NRSS (National Renewable Security Standards) Committee standards (the NRSS removable conditional access system is defined in EIA Draft Document IS-679, Project PN-3639). Selector 35 detects the presence of an insertable, compatible, descrambling card and provides the output of unit 40 to mux 37 only if the card is currently inserted in the video receiver unit. Otherwise selector 35 provides the output from decoder 30 to mux 37. The presence of the insertable card permits unit 40 to descramble additional premium program channels, for example, and provide additional program services to a viewer. It should be noted that in the preferred embodiment NRSS unit 40 and smart card unit 130 (smart card unit 130 is discussed later) share the same system 25 interface such that only either an NRSS card or a smart card may be inserted at any one time. However, the interfaces may also be separate to allow parallel operation.

The data provided to mux 37 from selector 35 is in the form of an MPEG compliant packetized transport datastream as defined in MPEG systems standard section 2.4 and includes program guide information and the data content of one or more program channels. The individual packets that comprise particular program channels are identified by Packet Identifiers (PIDs). The transport stream contains Program Specific Information (PSI) for use in identifying the PIDs and assembling individual data packets to recover the content of all the program channels that comprise the packetized datastream. Transport system 25, under the control of the system controller 115, acquires and collates program guide information from the input transport stream, storage device 90 or an Internet service provider via the communication interface unit 116. The individual packets that comprise either particular program channel content or Program Guide information, are identified by their Packet Identifiers (PIDs) contained within header information. As discussed above, the program description may comprise different program descriptive fields such as title, star, rating, etc., relating to a program.

The user interface incorporated in the video receiver shown in FIG. 2 enables a user to activate various features by selecting a desired feature from an on-screen display (OSD) menu. The OSD menu may include an electronic program guide (EPG) as described above and other features discussed below. Data representing information displayed in the OSD menu is generated by system controller 115 in response to stored program guide information, stored graphics information, and/or program guide and graphics information received via the input signal (e.g., StarSight data) as described above. The software control program may be stored, for example, in embedded memory (not shown) of system controller 115.

Using remote control unit 125 (or other selection means such as a mouse) a user can select from the OSD menu items such as a program to be viewed, a program to be stored, the type of storage media and manner of storage. System controller 115 uses the selection information, provided via remote unit interface 120, to configure system 25 to select the programs for storage and display and to generate PSI suitable for the selected storage device and media. Controller 115 configures system 25 elements 45, 47, 50, 55, 65 and 95 by setting control register values within these elements via a data bus and by selecting signal paths via muxes 37 and 110 with control signal C.

In response to control signal C, mux 37 selects either, the transport stream from unit 35, or in a playback mode, a datastream retrieved from storage device 90 via store interface 95. In normal, non-playback operation, the data packets comprising the program that the user selected to view are identified by their PIDs by selection unit 45. If an encryption indicator in the header data of the selected program packets indicates the packets are encrypted, unit 45 provides the packets to decryption unit 50. Otherwise unit 45 provides non-encrypted packets to transport decoder 55. Similarly, the data packets comprising the programs that the user selected for storage are identified by their PIDs by selection unit 47. Unit 47 provides encrypted packets to decryption unit 50 or non-encrypted packets to mux 110 based on the packet header encryption indicator information.

The functions of decryptors 40 and 50 may be implemented in a single removable smart card which is compatible with the NRSS standard. This approach places all security related functions in one removable unit that easily can be replaced if a service provider decides to change encryption technique or to permit easily changing the security system, e.g., to descramble a different service.

Units 45 and 47 employ PID detection filters that match the PIDs of incoming packets provided by mux 37 with PID values pre-loaded in control registers within units 45 and 47 by controller 115. The pre-loaded PIDs are used in units 47 and 45 to identify the data packets that are to be stored and the data packets that are to be decoded for use in providing a video image. The pre-loaded PIDs are stored in look-up tables in units 45 and 47. The PID look-up tables are memory mapped to encryption key tables in units 45 and 47 that associate encryption keys with each pre-loaded PID. The memory mapped PID and encryption key look-up tables permit units 45 and 47 to match encrypted packets containing a pre-loaded PID with associated encryption keys that permit their decryption. Non-encrypted packets do not have associated encryption keys. Units 45 and 47 provide both identified packets and their associated encryption keys to decryptor 50. The PID look-up table in unit 45 is also memory mapped to a destination table that matches packets containing pre-loaded PIDs with corresponding destination buffer locations in packet buffer 60. The encryption keys and destination buffer location addresses associated with the programs selected by a user for viewing or storage are pre-loaded into units 45 and 47 along with the assigned PIDs by controller 115. The encryption keys are generated by ISO 7816-3 compliant smart card system 130 from encryption codes extracted from the input datastream. The generation of the encryption keys is subject to customer entitlement determined from coded information in the input datastream and/or pre-stored on the insertable smart card itself (International Standards Organization document ISO 7816-3 of 1989 defines the interface and signal structures for a smart card system).

The packets provided by units 45 and 47 to unit 50 are encrypted using an encryption techniques such as the Data Encryption Standard (DES) defined in Federal Information Standards (FIPS) Publications 46, 74 and 81 provided by the National Technical Information Service, Department of Commerce. Unit 50 decrypts the encrypted packets using corresponding encryption keys provided by units 45 and 47 by applying decryption techniques appropriate for the selected encryption algorithm. The decrypted packets from unit 50 and the non-encrypted packets from unit 45 that comprise the program for display are provided to decoder 55. The decrypted packets from unit 50 and the non-encrypted packets from unit 47 that comprise the program for storage are provided to mux 110.

Unit 60 contains four packet buffers accessible by controller 115. One of the buffers is assigned to hold data destined for use by controller 115 and the other three buffers are assigned to hold packets that are destined for use by application devices 75, 80 and 85. Access to the packets stored in the four buffers within unit 60 by both controller 115 and by application interface 70 is controlled by buffer control unit 65. Unit 45 provides a destination flag to unit 65 for each packet identified by unit 45 for decoding. The flags indicate the individual unit 60 destination locations for the identified packets and are stored by control unit 65 in an internal memory table. Control unit 65 determines a series of read and write pointers associated with packets stored in buffer 60 based on the First-In-First-Out (FIFO) principle. The write pointers in conjunction with the destination flags permit sequential storage of an identified packet from units 45 or 50 in the next empty location within the appropriate destination buffer in unit 60. The read pointers permit sequential reading of packets from the appropriate unit 60 destination buffers by controller 115 and application interface 70.

The non-encrypted and decrypted packets provided by units 45 and 50 to decoder 55 contain a transport header as defined by section 2.4.3.2 of the MPEG systems standard. Decoder 55 determines from the transport header whether the non-encrypted and decrypted packets contain an adaptation field (per the MPEG systems standard). The adaptation field contains timing information including, for example, Program Clock References (PCRs) that permit synchronization and decoding of content packets. Upon detection of a timing information packet, that is a packet containing an adaptation field, decoder 55 signals controller 115, via an interrupt mechanism by setting a system interrupt, that the packet has been received. In addition, decoder 55 changes the timing packet destination flag in unit 65 and provides the packet to unit 60. By changing the unit 65 destination flag, unit 65 diverts the timing information packet provided by decoder 55 to the unit 60 buffer location assigned to hold data for use by controller 115, instead of an application buffer location.

Upon receiving the system interrupt set by decoder 55, controller 115 reads the timing information and PCR value and stores it in internal memory. PCR values of successive timing information packets are used by controller 115 to adjust the system 25 master clock (27 MHz). The difference between PCR based and master clock based estimates of the time interval between the receipt of successive timing packets, generated by controller 115, is used to adjust the system 25 master clock. Controller 115 achieves this by applying the derived time estimate difference to adjust the input control voltage of a voltage controlled oscillator used to generate the master clock. Controller 115 resets the system interrupt after storing the timing information in internal memory.

Packets received by decoder 55 from units 45 and 50 that contain program content including audio, video, caption, and other information, are directed by unit 65 from decoder 55 to the designated application device buffers in packet buffer 60. Application control unit 70 sequentially retrieves the audio, video, caption and other data from the designated buffers in buffer 60 and provides the data to corresponding application devices 75, 80 and 85. The application devices comprise audio and video decoders 80 and 85 and high speed data port 75. For example, packet data corresponding to a composite program guide generated by the controller 115 as described above, may be transported to the video decoder 85 for formatting into video signal suitable for display on a monitor (not shown) connected to the video decoder 85. Also, for example, data port 75 may be used to provide high speed data such as computer programs, for example, to a computer. Alternatively, port 75 may be used to output data to an HDTV decoder to display images corresponding to a selected program or a program guide, for example.

Packets that contain PSI information are recognized by unit 45 as destined for the controller 115 buffer in unit 60. The PSI packets are directed to this buffer by unit 65 via units 45, 50 and 55 in a similar manner to that described for packets containing program content. Controller 115 reads the PSI from unit 60 and stores it in internal memory.

Controller 115 also generates condensed PSI (CPSI) from the stored PSI and incorporates the CPSI in a packetized datastream suitable for storage on a selectable storage medium. The packet identification and direction is governed by controller 115 in conjunction with the unit 45 and unit 47 PID, destination and encryption key look-up tables and control unit 65 functions in the manner previously described.

In addition, controller 115 is coupled to a communication interface unit 116 that operates in a manner similar to interface unit 1113 in FIG. 1. That is, unit 116 provides the capability to upload and download information to and from the Internet. Communication interface unit 116 includes, for example, a modem for connecting to an Internet service provider, e.g., via a telephone line or via a cable television line. The communication capability allows the system shown in FIG. 2 to provide electronic message capability and Internet related features such as web browsing in addition to receiving television programming.

Figure 3:
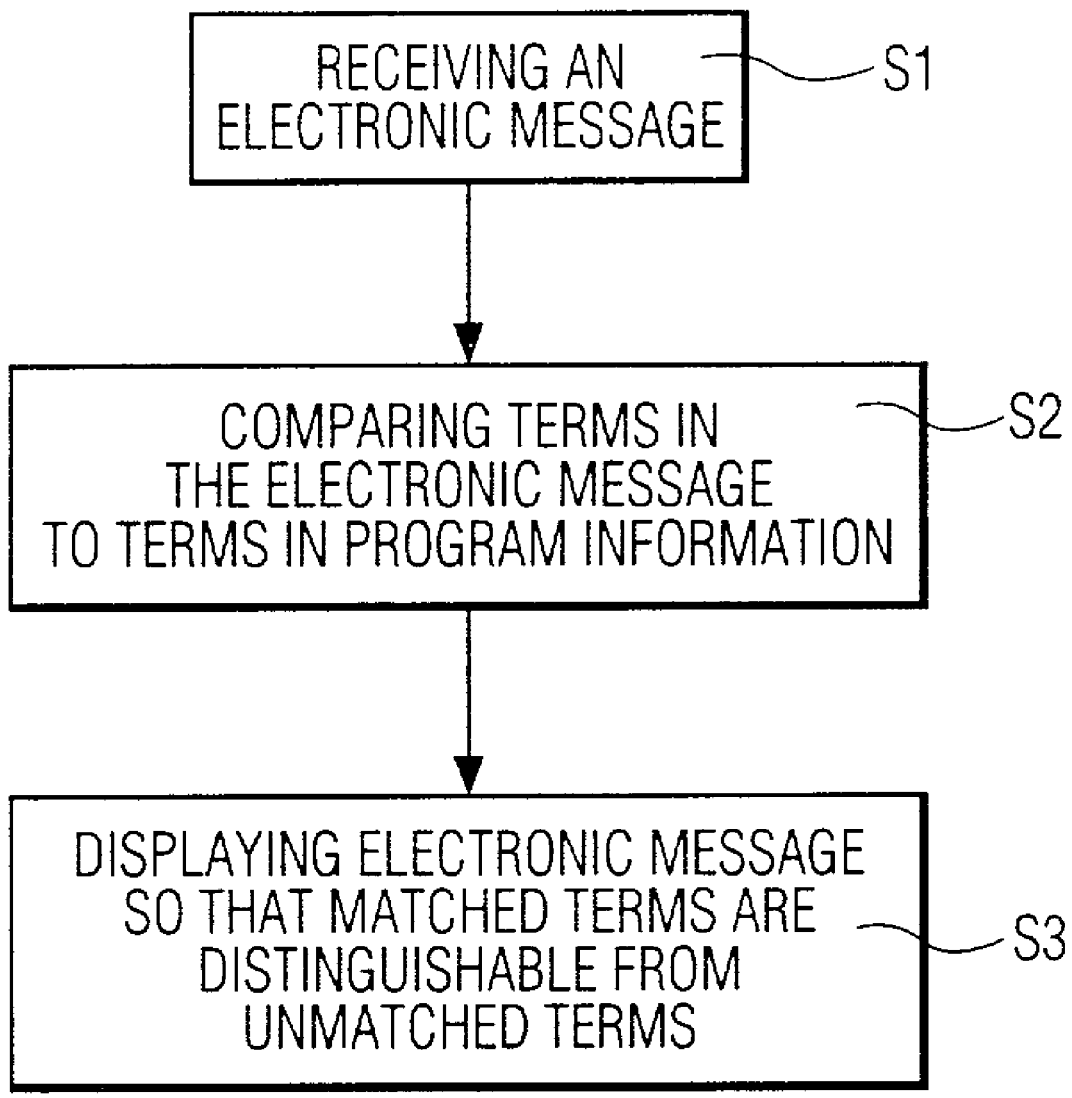
FIG. 3 is a flow chart of a method of electronically linking program information with the contents of an electronic message in accordance with a preferred implementation of the present invention.

FIG. 3 is a flow chart of an exemplary program which, according to the present invention, may be executed by controller 1110 of FIG. 1, controller 115 of FIG. 2, or any other suitably programmed control arrangement of an electronic host device. The term "electronic host device" as used herein is not limited to television receivers or personal computers, but rather encompasses hybrids thereof (e.g., PCTVs), cable television converter boxes, suitably equipped audiovisual program recorders (e.g., video tape recorders), satellite television and/or data signal converters, program guide receiver units, and the like, regardless of whether incorporated into a television receiver or personal computer or connected externally thereto. It will be appreciated that the exemplary program may be implemented in hardware, software, or a combination thereof.

The exemplary program, when executed, facilitates electronic linking of contents of an electronic message to program information, and also facilitates implementation of programs associated with program information matching the contents of the electronic message, in accordance with the present invention. A person skilled in the art would readily recognize from the flow chart and the following description that the exemplary program when executed by any one of the systems illustrated in FIGS. 1 and 2 or by any other suitably programmed electronic host device will provide substantially the same features and advantages in accordance with the present invention. Therefore, to avoid redundancy, the exemplary program will be described below only with respect to the exemplary hardware implementation of the electronic host device shown in FIG. 1.

In FIG. 1, the microprocessor 1110 is connected to the EEPROM 1127. The exemplary program may be stored in the EEPROM 1127 for execution by the microprocessor 1110. One object of the exemplary program is to electronically link program information in an electronic program guide (EPG) (e.g., the StarSight® information) and/or in an extended program guide, to contents of an incoming or received electronic message. This way, the advantages associated with linking program information to terms in an electronic message can be achieved, according to the present invention, without requiring the electronic message sender to have a corresponding host device or program guide capabilities.

According to the exemplary program, the controller 1110 initially executes the step S1 of receiving an electronic message (e.g., via communication interface 1113). The incoming electronic message preferably is processed and stored in a substantially conventional way. The controller 1110 then performs the step S2 of comparing terms in the electronic message to terms in the program information of the EPG.

The program information of the EPG can include, for example, a program start time, a program end time, a program duration, a channel via which the program is transmitted, characteristic information, and combinations thereof. Examples of the characteristic information include program title, program theme, program category, program keywords, a program description, program type (e.g. audio, video, audiovisual, computer, Internet, and the like), and program repeat frequency (e.g., once per week, daily, etc.). While the program information preferably is drawn for comparison from the StarSight Module 1160 where it is stored, it is understood that the present invention is not limited in this regard. To the contrary, the program information can be extracted for comparison from the EEPROM 1127, from the communication interface unit 1113, or the like.

Based on the comparison performed in step 2, the controller 1110 causes the electronic message to be displayed in step 3 so that any terms in the electronic message which have a match in the program information are distinguishable from terms which have no such match. An electronic link preferably is established by the controller 1110 between any matched term in the electronic message and the program information which has a match for that or those term(s). The electronic link preferably includes a recipient-selectable version of the matched term which is displayed in the electronic message.

Figure 4:
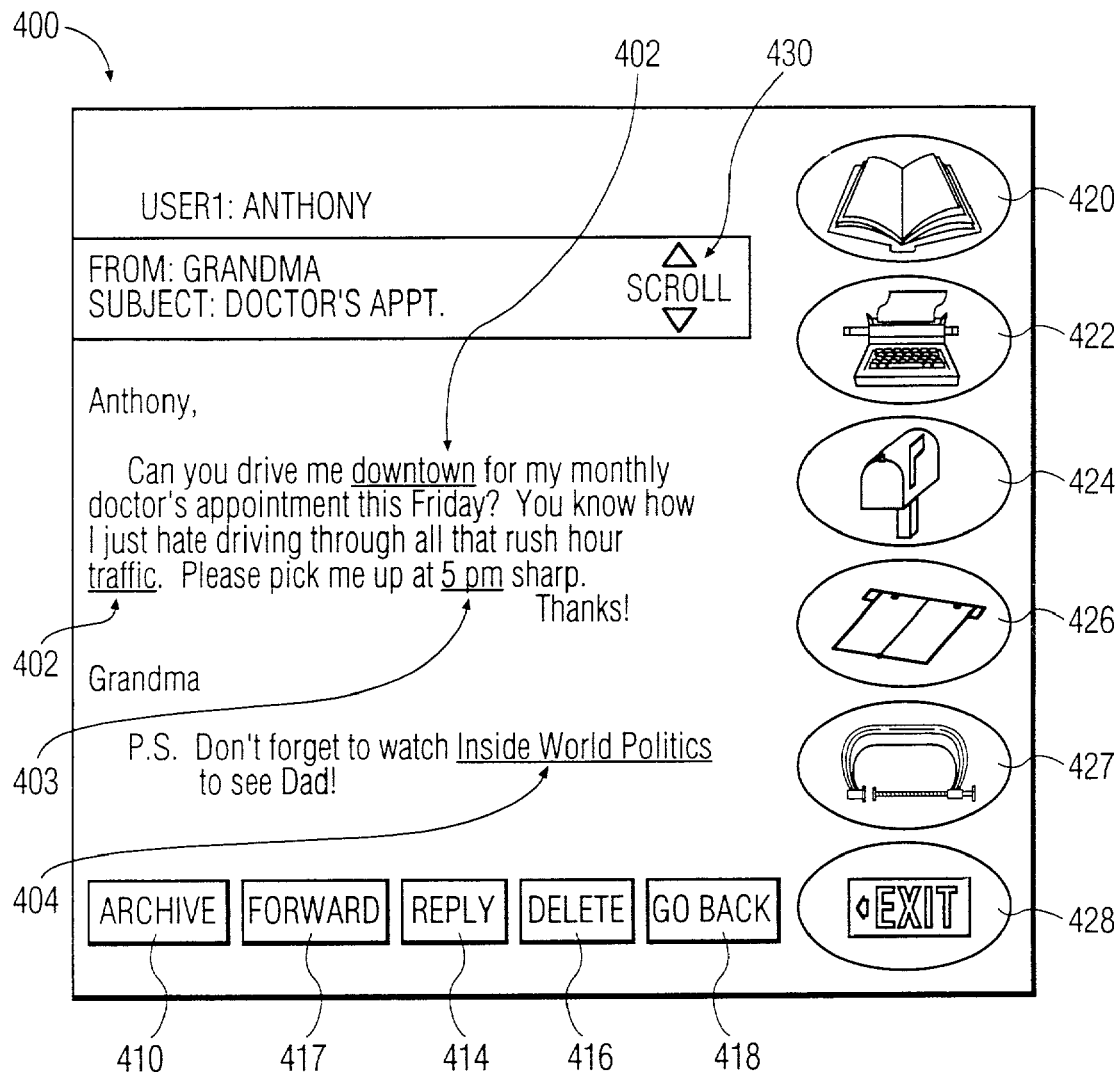
FIG. 4 shows an electronic message display according to a preferred implementation of the present invention.

FIG. 4 shows an exemplary electronic message display 400 which is generated by the controller 1110 when the controller 1110 is programmed to link terms in an incoming electronic message to program information in the electronic program guide (EPG) (e.g., the StarSight® information in the system of FIG. 1 or program guide information from program guide packets in the digital data stream processed by the system in FIG. 2), as well as program information in the extended program guide. The terms 402 which have a match in the program information of the EPG or the extended program guide are designated by underlined text in the exemplary display of FIG. 4. It is understood, however, that this designation can be provided using other distinguishing characteristics, such as different colors of text, different typeface, different styling, and the like.

Figure 5:
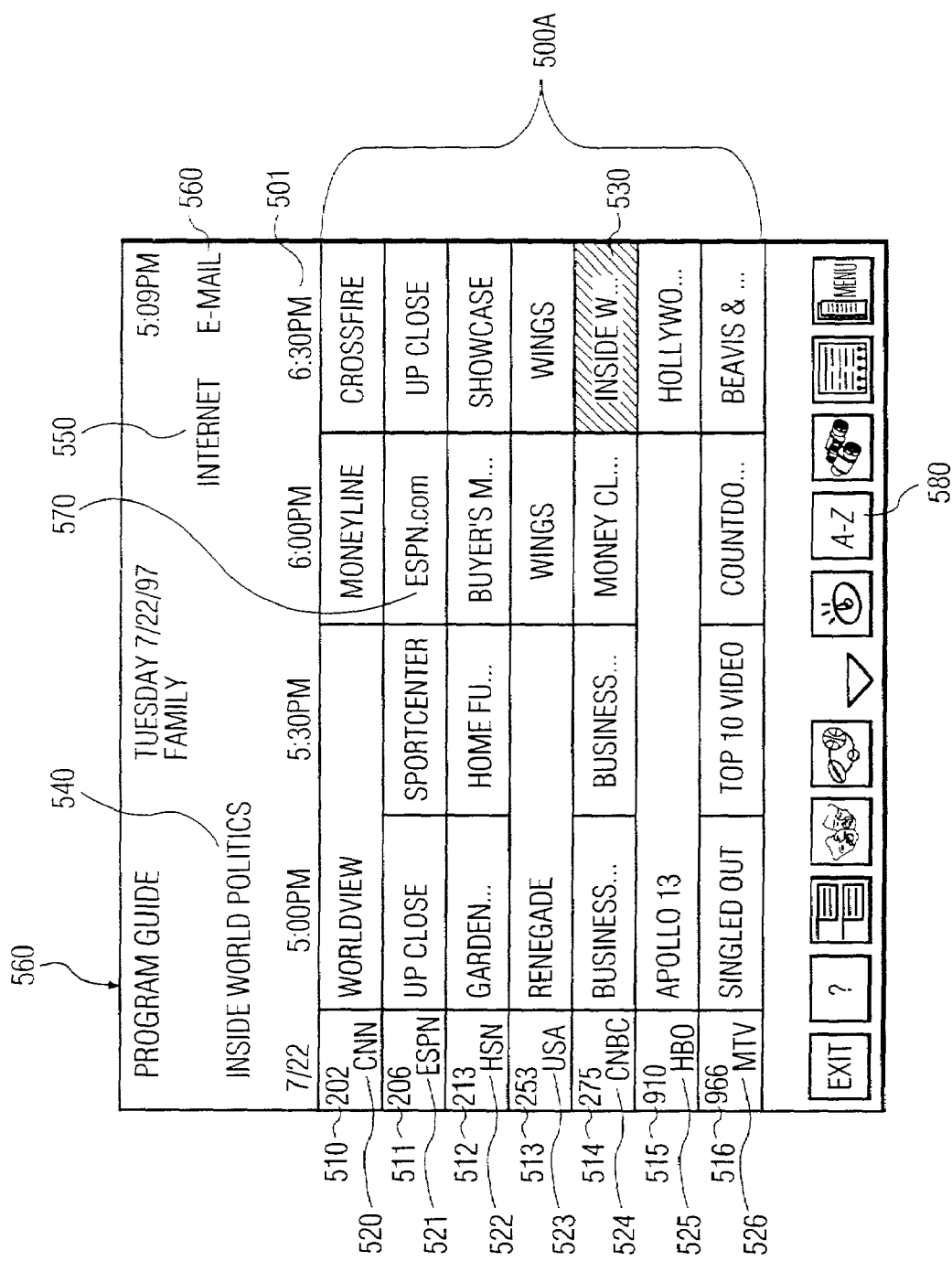
FIG. 5 shows an exemplary EPG menu according to a preferred implementation of the present invention.

The term "Inside World Politics" 404, for example, has a match in the program information which is a program title for a program as shown in cell 530 of an EPG display 500. The controller 1110 therefore displays the term 404 with underlining and establishes an electronic link. Selection of the term 404 will cause, for example, EPG 500 to be displayed with the show "Inside World Politics" to be highlighted as shown in FIG. 5.

The term "downtown", for example, has a match in the program information which provides maps of a region. The controller 1110 therefore displays the term "downtown" with underlining and establishes an electronic link whereby selection of the term "downtown" from the electronic message display 400 causes or facilitates implementation of the corresponding extended program information. If the controller 1110 is programmed to effect automatic implementation in response to selection of the term "downtown", then the controller 1110 responds to such a selection by displaying the relevant map(s). In this regard, the present invention provides a system which establishes an electronic link so that selection of the matched term(s) by a user effects implementation of a respective program which is defined by the program information having the match.

Preferably, the automatic implementation is performed based on the match-containing program information. In particular, the controller 1110 responds to a selection of the matched term by tuning to a specified channel, communicating with a specified remote computer server, or connecting to a specified web-site, as specified by the match-containing program information.

The term "traffic" similarly has a match in the extended program information relating to traffic reports. Selection of the term "traffic" therefore causes the controller 1110 to access and display the relevant traffic reports.

Thus, in the exemplary context of extended program guide information (e.g. where the extended guide information provides news, sports, traffic, and/or weather information), the controller 1110 can be programmed to provide automatic program implementation by downloading or tuning to information in certain channels and/or segments of the extended program information.

For matched terms which relate to a single item of television-related program information, the controller 1110 may be programmed to respond to selection of the matched term by automatically implementing the relevant television program. Examples of such implementation include displaying of a program which corresponds to the matching program information (e.g., automatic tuning to that program if it is currently being aired or setting a timer for tuning at a later time if the program is not being aired but will be broadcast at a later time), recording of the program, and displaying all or parts of the program information which contains the matched term.

In the context of web-sites, examples of automatic implementation include establishing a communication link to that particular web-site or to a particular "page" of the web-site. Similarly, examples of automatic implementation, in the context of computer programs, include downloading and/or execution of such computer programs.

Alternatively, the controller 1110 can be programmed to respond interactively to selection of the matched term(s) by causing a menu of user-selectable choices to be displayed to the user, each choice corresponding to a particular option on how the program of interest will be implemented. Preferably, this is performed by the controller (e.g., controller 1110) automatically based on the program information which contains the matching term.

The controller 1110, in this regard, may be programmed so that a recipient's selection of the matched term (e.g., "downtown" or "traffic") causes the controller 1110 to display an electronically generated menu of choices, each of the choices being selectable by the recipient to effect the action described by the choice. Examples of choices for the term "downtown" include displaying of a description of maps which cover the downtown area, displaying of the actual maps, disregarding of the electronic link (i.e., returning to the electronic message display 400), and the like.

For matched terms which relate to a single item of television-related program information, the controller 1110 preferably is programmed to respond to selection of the matched term by displaying choices on how and whether to implement the relevant television program. Examples of such choices include displaying of a program which corresponds to the matching program information (e.g., automatic tuning to that program if it is currently being aired or setting a timer for tuning at a later time if the program is not being aired but will be broadcast at a later time), recording of the program, and displaying all or parts of the program information having the match.

Preferably, the television-encompassing version of the host device shown in FIG. 11s associated with a recording device (not shown), and the selector is actuatable to effect recording of the television program when the electronic message recipient selects the matched term associated with a television program and elects to record the television program.

In the foregoing example for the term "downtown", the subject term had only one match in the collection of program information. Some terms, however, will have multiple matches. The term "5 pm" is an example of a term having multiple matches. In particular, it has matches in the program information of several programs which air at 5 pm. Thus, selection of the term "5 pm" causes the controller 1110 to visually display the portion of the electronic program guide which carries the line-up of such programs. The program identifiers in the resulting program line-up then are selectable to implement or otherwise facilitate implementation of desired ones of the programs.

More specifically, the controller 1110 generates a menu of programs which air or are accessible at or about 5 pm by displaying program identifiers on a display device associated with the electronic host device. Each of the program identifiers designates one of a plurality of programs which can be implemented (e.g., displayed, audibly broadcast, or executed) by the electronic host device itself or which can be implemented at 5 pm by a display device, audio equipment or a computer associated with the electronic host device.

In generating the menu, the CPU 1112 transfers formatted StarSight® EPG display data from StarSight® module 1160 via I$^2$C BUS to OSD processor 1117. OSD processor 1117 operates in a conventional manner to produce R, G, and B video signals OSD_RGB that, when coupled to the display device, will produce a displayed image representing on-screen display information such as graphics and/or text comprising an EPG. This on-screen display information includes, among other things, the aforementioned program identifiers. It also may include characteristic information pertaining to each of the programs represented by the program identifiers. Examples of the characteristic information include program title, program theme, program category, program keywords, program description, program type, program length, program starting time, program ending time, repeat frequency, or combinations thereof.

The display data included in the EPG display and produced by OSD processor 1117 is incorporated into the output signal by VSP 1155 in response to fast switch signal FSW. When controller 1110 detects activation of the EPG display (e.g., when a user presses an appropriate key on remote control 1125 or when a matched term 402 having multiple matches is otherwise selected), controller 1110 causes OSD processor 1117 to produce the EPG menu display using the program information provided by the StarSight® module 1160. Controller 1110 causes VSP 1155 to combine the EPG display menu from OSD processor 1117 and the video image signal in response to signal FSW to produce a display including the EPG menu. The EPG menu can occupy all or only a portion of the display area.

An exemplary EPG menu 500 is shown in FIG. 5. The menu 500 includes a "grid guide" 500A which shows a program schedule in a time-and-channel format, similar to a TV schedule listed in a newspaper One dimension (e.g. the horizontal dimension) of the "grid guide" 500A shows the time information 501, while the other dimension (e.g. the vertical dimension) of the "grid guide" 500A shows channel information. When an abbreviated element 530 of the "grid guide" is highlighted or a cursor is located thereon, as will be described hereinafter, truncated parts of the abbreviated element 530 appear in a "highlighted text" field 540 of the menu 500.

In the menu 500, each of the program identifiers (e.g., channel numbers 510–516, channel station names 520–526, web-site identifier 570, Internet identifier 550, electronic message identifier 560, and the like) is selectable by a user to implement respective ones of the programs. In particular, the control program in EEPROM 1127 causes the controller 1110 to monitor the location of a position indicator, such as a cursor and/or highlighting, on the EPG menu display. A user controls the location of the position indicator using direction and selection keys of remote control 1125. Alternatively, the system could include a mouse device or an appropriate pointer device.

Controller 1110 detects activation of a selection device, such as clicking of a mouse button, and evaluates current cursor/highlighting location information in conjunction with EPG menu data being displayed to determine the function desired (e.g., implementing a particular program). If such activation of the selection device is performed while the cursor and/or highlighting is located on one of the program identifiers, the controller 1110 determines that the corresponding program is to be implemented (i.e., displayed, audibly broadcast, and/or executed). Controller 1110 subsequently activates the control action associated with the selected program.

If, for example, the selected program identifier represents a web-site, the controller 1110 implements a web-browsing program and accesses the corresponding web-site. When the selected program identifier is associated with an audio program, video program, or audiovisual program, the controller 1110 responds by tuning the electronic host device or an associated receiver to the appropriate channel and by displaying and/or audibly broadcasting that program. Highlighting of such programs and subsequent selection of other function icons on the menu 500 can implement automatic tuning at a later time to the selected program or automatic recording thereof by the electronic host device or by another device connected to the electronic host device.

Selection of the "Internet" identifier 550 causes the controller 1110 to implement a web-browsing program through an Internet service provider, while selection of the "e-mail" identifier 560 causes the controller 1110 to implement an electronic message transmission and/or reception program through the same or a different Internet service provider.

Alternatively, the controller 1110 is programmed or otherwise adapted to perform the step of displaying an electronically generated menu of choices in response to a user's selection of one of the program identifiers. Each of the choices is user-selectable to effect an action described by each choice, the action being performed with respect to the program which corresponds to the selected program identifier. Examples of such choices include displaying of the program (whether now or later), recording of the program, or displaying of the program information associated with the selected program.

The menu 500 in FIG. 5 thus provides a generally effective, versatile, and convenient EPG arrangement which is activated when a matched term in an incoming electronic message is selected and a match for that term appears in the program information of more than one of the programs listed in the EPG.

The exemplary electronic message display 400 in FIG. 1 also includes several user-selectable icons 410–430 which represent various electronic message functions which can be carried out in a manner well known in the art. Examples of such functions include archiving e-mail, forwarding e-mail, replying to electronic messages, deleting electronic messages, going back to a previous "Window", scrolling through an electronic message, reading e-mail, composing e-mail, reviewing messages in a mailbox, filing or storing of electronic messages, attaching files, and exiting. Preferably, the controller 1110 is programmed to execute respective ones of the functions in response to selection of a corresponding one of the icons 410–430.

The exemplary embodiment shown in FIG. 1 and the method described above, when executed by the exemplary embodiment, advantageously provide an electronic message interface adapted to link terms in an electronic message to program information in an electronic program guide (EPG). An electronic message receiver adapted to receive an electronic message is provided by the controller 1110, in combination with the communication interface 1113 and suitable electronic message reception software. A comparison unit associated with the electronic message receiver and adapted to compare terms in the electronic message to terms in the program information of the EPC can be provided by appropriately programming the controller 1110 to perform the comparison. Alternatively, a separate and distinct comparison unit can be connected to the controller 1110.

The interface also preferably includes a display device connected at least indirectly to the comparison unit (e.g., controller 1110) and adapted to display the electronic message so that any terms in the electronic message which have a match in the program information based on the comparison of terms, are distinguishable from terms which have no such match.

The resulting interface provides an electronic link between program information and terms in the incoming electronic message. A selector (e.g., remote control 1125, a mouse, keyboard, virtual keyboard, and/or movable cursor) is adapted to select, in response to user operation, any term with a match via the electronic link. Implementation then is facilitated either immediately or after selecting among different programs which match the term and/or among different choices on how and whether to implement the program.

The word "term", as used in the foregoing examples, is not intended to be limited to a single word. Instead, it is understood that the comparison of "terms" can be performed on strings of words or even on strings of characters which amount to less than one word.

While the interactive implementation scheme wherein the controller 1110 provides choices to the recipient of how and if to implement the subject program has been described as an alternative to the automatic implementation schemes (wherein the selection of the program causes the controller 1110 to automatically implement the subject program). It will be understood that the controller 1110 can be programmed to provide a hybrid of such schemes. In particular, the controller 1110 can be programmed to automatically implement programs which are best suited for such automatic implementation (e.g. according to the match-containing program information) and to interactively provide choices to the recipient when the program information associated with the selected program indicates that the underlying program is best suited for interactive implementation.

While the present invention finds much usefulness in the realm of electronic host devices which are connected to or defined by a television set, the present invention is not limited to such electronic host devices. The present invention may be implemented, for example, with a computer as the electronic host device, and the user-selectable matched term 402 may include an electronic shortcut to a corresponding computer program.

The method described above and the systems through which it can be implemented (e.g., the systems shown in FIGS. 1 and 2) thus provide an electronically generated interface which facilitates linking of program guide information in an electronic message to program guide information of a recipient, and implementation of programs associated therewith. The electronically generated interface also facilitates generation of electronic program guides based on information in an electronic message, without having to manually transcribe or memorize terms in the electronic message.

While each host device (e.g., the devices illustrated in FIGS. 1 and 2) preferably is programmed or otherwise adapted to provide all of the foregoing features, it is understood that the invention is not limited in this regard. That is, host devices man provide only one or some of the features described above, such host devices nevertheless falling well within the spirit and scope of the present invention.

In describing the preferred embodiments, some components were described as being hardware components and others were described as software components. Such components, however, can be implemented using hardware, software, or combinations thereof.

It is to be understood that the embodiments and variations shown and described herein are for illustrations only and that various modifications may be implemented by those skilled in the art without departing from the scope and spirit of the invention.

The invention claimed is:

1. A method of linking terms in an electronic message to program information in an electronic program guide (EPG), said method comprising the steps of:
   receiving an electronic message;
   comparing terms in said electronic message to terms in the program information of the EPG;
   displaying said electronic message so that any terms in said electronic message which have a match in said program information based on said step of comparing terms, are distinguishable from terms which have no such match;
   establishing an electronic link between at least one term in said electronic message and any program information which has a match for said at least one term; and
   displaying an electronically generated menu of program identifiers in response to user selection of said at least one term in said electronic message, wherein said at least one term appears in the program information of more than one program in the EPG, each of the program identifiers corresponding to a respective one of said more than one program and being user selectable to effect implementation of said respective one of said more than one program.

2. A method of linking terms in an electronic message to program information in an electronic program guide (EPG), said method comprising the steps of:
   receiving an electronic message;
   comparing terms in said electronic message to terms in the program information of the EPG;
   displaying said electronic message so that any terms in said electronic message which have a match in said program information based on said step of comparing terms, are distinguishable from terms which have no such match;
   establishing an electronic link between at least one term in said electronic message and any program information which has a match for said at least one term; and
   displaying an electronically generated menu of program identifiers in response to user selection of said at least one term in said electronic message, wherein said at least one term appears in the program information of more than one program in the EPG, wherein each of the program identifiers corresponds to a respective one of said more than one program and is user selectable; and
   displaying an electronically generated menu of choices in response to user selection of one of said program identifiers, each of said choices being user selectable to effect an action described by each choice, said action being performed with respect to said respective one of said more than one program which corresponds to said one of said program identifiers.

3. The method of claim 2, wherein said choices include:
   displaying of said respective one of said more than one program;
   recording of said respective one of said more than one program; and
   displaying of the program information of said respective one of said more than one program.

4. An electronic message interface adapted to link terms in an electronic message to program information in an electronic program guide (EPG), said electronic message interface comprising:
   a receiver adapted to receive an electronic message;
   comparison unit associated with said receiver, said comparison unit being adapted to compare terms in said electronic message to terms in the program information of the EPG;
   a display device coupled to said comparison unit and adapted to display said electronic message so that any terms in said electronic message which have a match in said program information based on the comparing of terms, are distinguishable from terms which have no such match; and
   an electronic link between at least one term in said electronic message and any program information which has a match for said at least one term, wherein said display device further is adapted to display a menu of program identifiers in response to user selection of said at least one term in said electronic message, wherein said at least one term appears in the program information of more than one program in the EPG, each of the program identifiers corresponding to a respective one of said more than one program and being user selectable to effect implementation of said respective one of said more than one program.

5. An electronic message interface adapted to link terms in an electronic message to program information in an electronic program guide (EPG), said electronic message interface comprising:
   a receiver adapted to receive an electronic message;
   comparison unit associated with said receiver, said comparison unit being adapted to compare terms in said electronic message to terms in the program information of the EPG;
   a display device coupled to said comparison unit and adapted to display said electronic message so that any terms in said electronic message which have a match in said program information based on the comparing of terms, are distinguishable from terms which have no such match; and
   an electronic link between at least one term in said electronic message and any program information which has a match for said at least one term, wherein said display device further is adapted to display a menu of program identifiers in response to user selection of said at least one term in said electronic message, wherein said at least one term appears in the program information of more than one program in the EPG, wherein each of the program identifiers corresponds to a respective one of said more than one program and is user selectable; and
   wherein said display device further is adapted to display a menu of choices in response to user selection of one of said program identifiers, each of said choices being user selectable to effect an action described by each choice, said action being performed with respect to said respective one of said more than one program which corresponds to said one of said program identifiers.

6. The interface of claim 5, wherein said choices include:
   displaying of said respective one of said more than one program;
   recording of said respective one of said more than one program; and
   displaying of the program information of said respective one of said more than one program.

* * * * *